(12) United States Patent
Chang et al.

(10) Patent No.: US 12,019,485 B2
(45) Date of Patent: Jun. 25, 2024

(54) STORAGE DEVICE TESTING MODULE

(71) Applicant: SAMSUNG ELECTRONICS CO., LTD., Suwon-si (KR)

(72) Inventors: Yun Chang, Hwaseong-si (KR); Sanggeun Yoo, Seoul (KR); Kwangkyu Bang, Hwaseong-si (KR); Kiljoong Yun, Hwaseong-si (KR); Songrye Choi, Jeollanam-do (KR); Jaegyu Choi, Seongnam-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 191 days.

(21) Appl. No.: 17/661,703

(22) Filed: May 2, 2022

(65) Prior Publication Data

US 2023/0087045 A1    Mar. 23, 2023

(30) Foreign Application Priority Data

Sep. 23, 2021    (KR) .......................... 10-2021-0125578

(51) Int. Cl.
 *G06F 1/18*    (2006.01)
(52) U.S. Cl.
 CPC .................................. *G06F 1/187* (2013.01)
(58) Field of Classification Search
 CPC . G06F 1/187; G06F 1/18; G06F 1/181; G06F 1/183; G06F 9/02; G06F 9/00; G06F 15/00; G11B 33/128; G11B 33/127; G11B 33/126; G11B 33/125; G11B 33/12; G11B 33/121; G11B 33/122; G11B 33/123
 See application file for complete search history.

(56) References Cited

U.S. PATENT DOCUMENTS

| 8,041,449 B2 | 10/2011 | Noble et al. | |
|---|---|---|---|
| 10,288,681 B2 | 5/2019 | Champoux et al. | |
| 2008/0298005 A1* | 12/2008 | Deng | G06F 1/187 |
| | | | 361/825 |
| 2009/0168323 A1* | 7/2009 | Yeh | G06F 1/187 |
| | | | 361/679.33 |
| 2009/0296338 A1* | 12/2009 | Peng | G11B 33/121 |
| | | | 248/231.9 |
| 2010/0270450 A1* | 10/2010 | Lu | G06F 1/187 |
| | | | 248/274.1 |

(Continued)

FOREIGN PATENT DOCUMENTS

| KR | 10-2015-0047784 | 5/2016 |
|---|---|---|
| KR | 10-1772673 | 8/2017 |

(Continued)

*Primary Examiner* — Alvaro E Fortich
(74) *Attorney, Agent, or Firm* — F. CHAU & ASSOCIATES, LLC (57) ABSTRACT

A storage device testing module includes a plate and a test board disposed on the plate and including a storage device receiver, the storage device receiver receiving a storage device to be tested. The storage device testing module further includes a sensor including a plurality of switches disposed on an inner surface of the storage device receiver, the plurality of switches being activated by movement of the storage device into the storage device receiver. The storage device testing module further includes a plurality of plungers disposed on the inner surface, contacting and supporting the storage device.

20 Claims, 9 Drawing Sheets

(56) References Cited

U.S. PATENT DOCUMENTS

| | | | |
|---|---|---|---|
| 2012/0023370 A1* | 1/2012 | Truebenbach | G11B 17/225 |
| | | | 714/E11.171 |
| 2016/0120971 A1 | 4/2016 | Bae et al. | |
| 2020/0150178 A1 | 5/2020 | Chen et al. | |

FOREIGN PATENT DOCUMENTS

| | | |
|---|---|---|
| KR | 20-0490761 | 2/2020 |
| KR | 10-2164506 | 9/2020 |

* cited by examiner

STORAGE DEVICE TESTING MODULE

CROSS-REFERENCE TO RELATED APPLICATIONS

This application claims priority under 35 U.S.C. § 119 to Korean Patent Application No. 10-2021-0125578, filed on Sep. 23, 2021, in the Korean Intellectual Property Office (KIPO), the disclosure of which is incorporated by reference herein in their entirety.

TECHNICAL FIELD

The inventive concept relates to a storage device testing module, and more particularly, to a storage device testing module that may secure a storage device during a testing process.

DISCUSSION OF RELATED ART

During a testing process of a storage device such as a solid state drive (SSD), environmental changes such as temperature changes, airflow changes, etc., may disturb the storage device from its mounted position in a testing device. When the storage device is not mounted securely in the testing device, phenomena such as electrostatic discharge (ESD) and electromagnetic interference (EMI) may deteriorate the reliability of the testing process.

SUMMARY

Aspects of the inventive concept provides a storage device testing module capable of preventing/reducing failures that may occur in mounting a storage device on a test board of the storage device testing module.

According to at least one embodiment of the inventive concept, a storage device testing module is provided. The storage device testing module includes a plate and a test board disposed on the plate and including a storage device receiver, the storage device receiver receiving a storage device to be tested. The storage device testing module further includes a sensor including a plurality of switches disposed on an inner surface of the storage device receiver, the plurality of switches being activated by movement of the storage device into the storage device receiver. The storage device testing module further includes a plurality of plungers disposed on the inner surface, contacting and supporting the storage device.

According to at least one embodiment of the inventive concept, a storage device testing module is provided. The storage device testing module includes a plate and a test board disposed on the plate and including a storage device receiver, the storage device receiver receiving a storage device to be tested. The storage device testing module further includes a housing disposed on the plate and at least partially surrounding the test board, the housing protecting the test board from an external environment, and a camera disposed in the housing and facing the test board, the camera configured to photograph the storage device.

According to at least one embodiment of the inventive concept, a storage device testing module is provided. The storage device testing module includes a plate and a test board disposed on the plate and including a storage device receiver, the storage device receiver receiving a storage device to be tested. The storage device testing module further includes a sensor including a plurality of switches disposed on an inner surface of the storage device receiver, the plurality of switches being activated by movement of the storage device into the storage device receiver. The storage device testing module further includes a plurality of plungers disposed on the inner surface, contacting and supporting the storage device, a housing disposed on the plate and at least partially surrounding the test board, the housing configured to protect the test board from an external environment, and a camera disposed in the housing and facing the test board, the camera configured to determine that the storage device is secure in the storage device receiver by photographing the storage device.

BRIEF DESCRIPTION OF THE DRAWINGS

The above and other features of the present inventive concept will become more apparent by describing in detail embodiments thereof with reference to the accompanying drawings, in which.

DETAILED DESCRIPTION OF EXAMPLE EMBODIMENTS

Embodiments of the inventive concept will be described more fully hereinafter with reference to the accompanying drawings. Like reference numerals may refer to like elements throughout the accompanying drawings.

It will be understood that when an element or layer is referred to as being "over," "above," "on," "below," "under," "beneath," "connected to" or "coupled to" another element or layer, it can be directly over, above, on, below, under, beneath, connected or coupled to the other element or layer or intervening elements or layers may be present.

It will be understood that, although the terms "first", "second", etc. may be used herein to describe various elements, components, regions, layers and/or sections, these elements, components, regions, layers and/or sections should not be limited by these terms. These terms are only used to distinguish one element, component, region, layer or section from another element, component, region, layer, or section. Thus, a first element, component, region, layer, or section discussed below could be termed a second element, component, region, layer, or section without departing from the teachings of the embodiments.

As used herein, the singular forms "a," "an" and "the" are intended to include the plural forms as well, unless the context clearly indicates otherwise.

According to some aspects of the inventive concept, a storage device testing module may use a sensor to confirm whether or not a storage device is mounted on a test board, and the storage device testing module may prevent the storage device from being pushed back in an insertion process of the storage device by using plungers. Furthermore, the storage device testing module may use a housing to remove external interference factors, the storage device testing module may control an evaluation test case for each product according to label information or a pin number scanned using a camera, and the storage device testing module may check whether or not the storage device is mounted securely in the storage device testing module.

Figure 1:
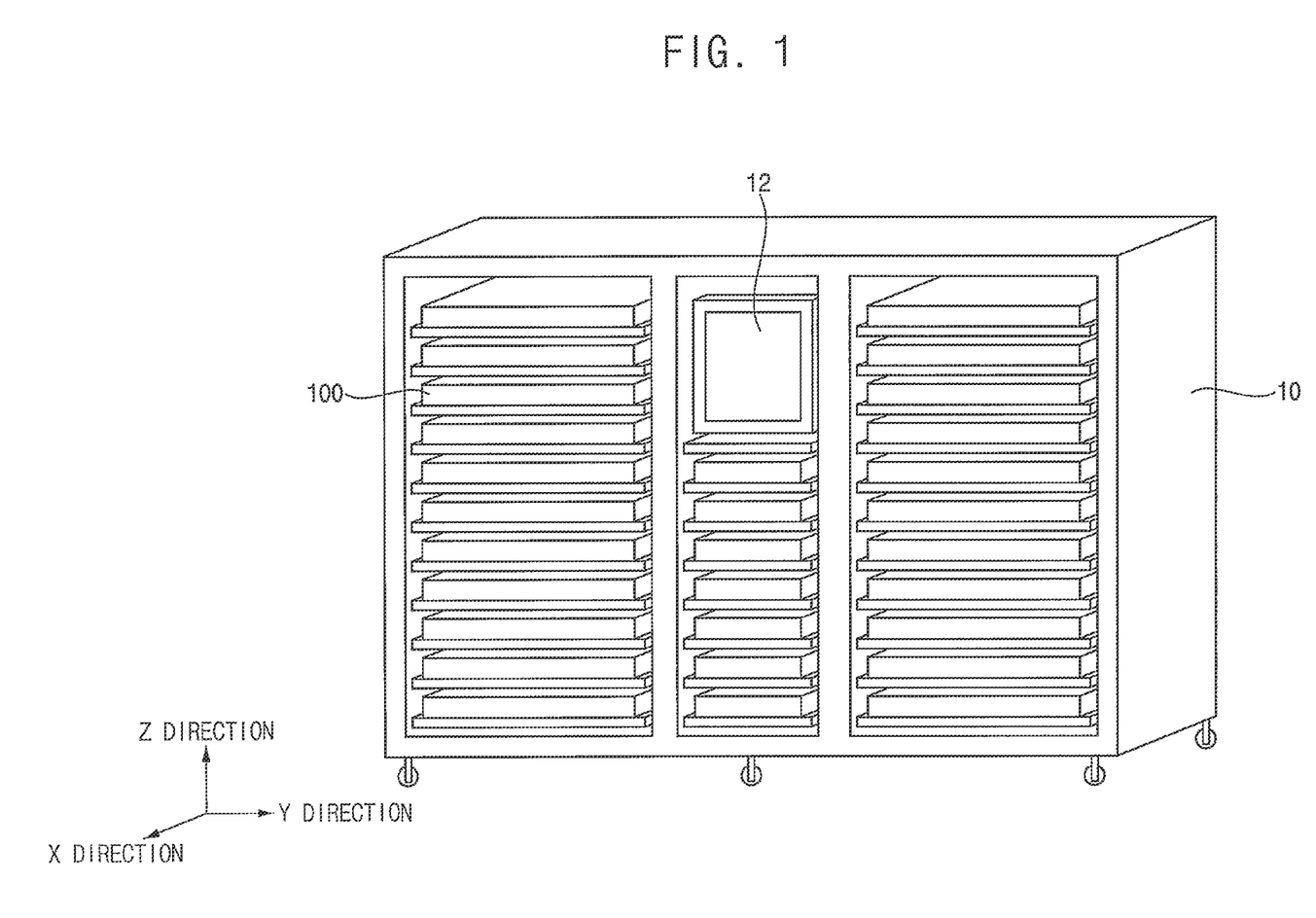
FIG. 1 is a perspective view of a storage device testing system according to at least one embodiment of the inventive concept.
Figure 2:
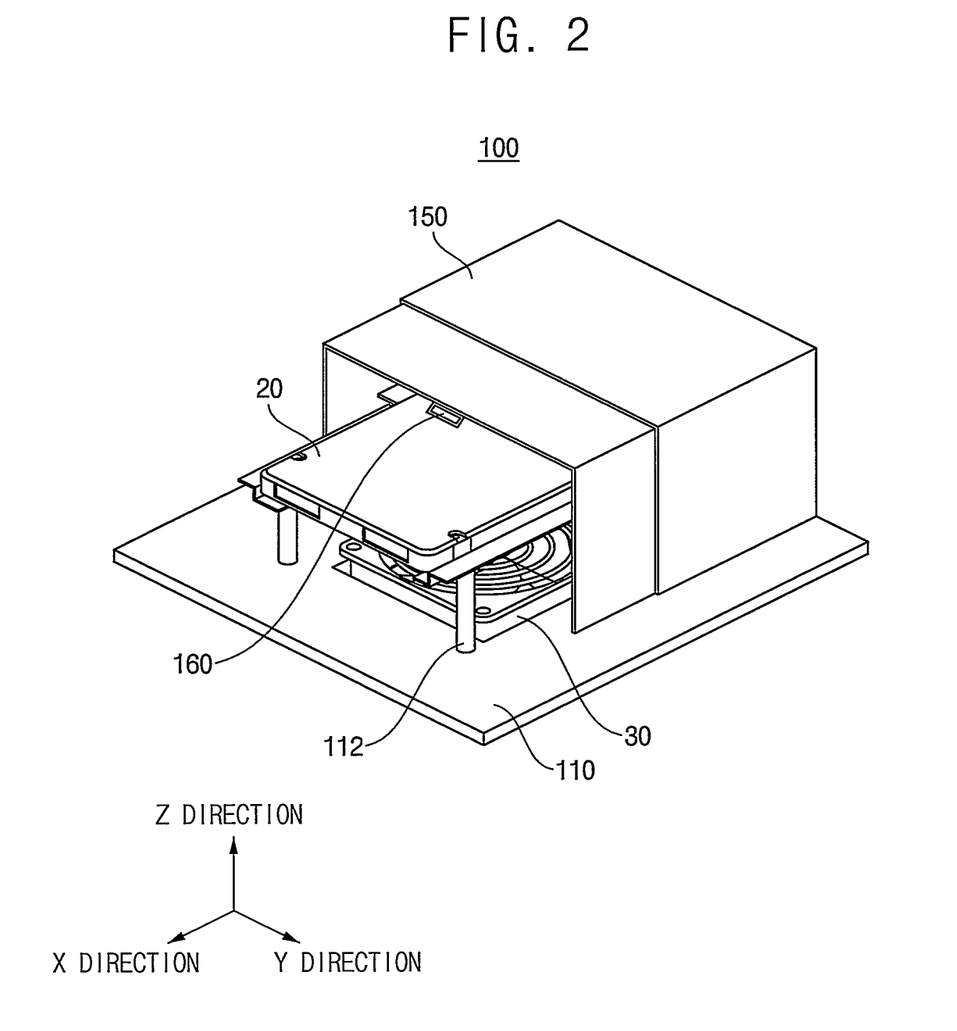
FIGS. 2 and 3 are perspective views of a test module for a storage device according to at least one embodiment of the inventive concept.
Figure 3:
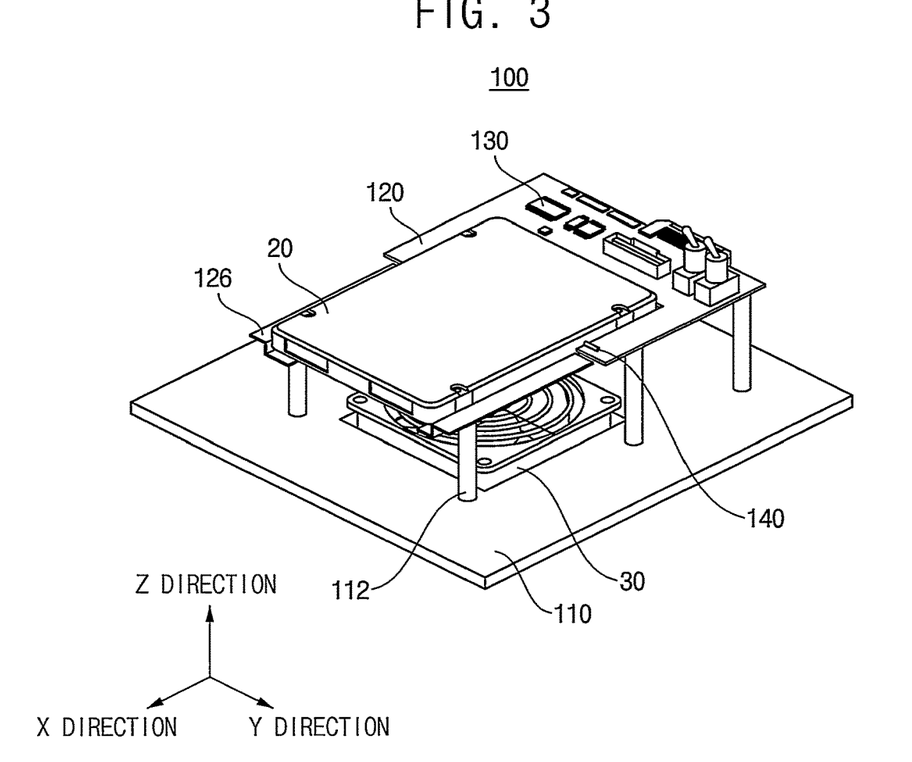
Figure 4:
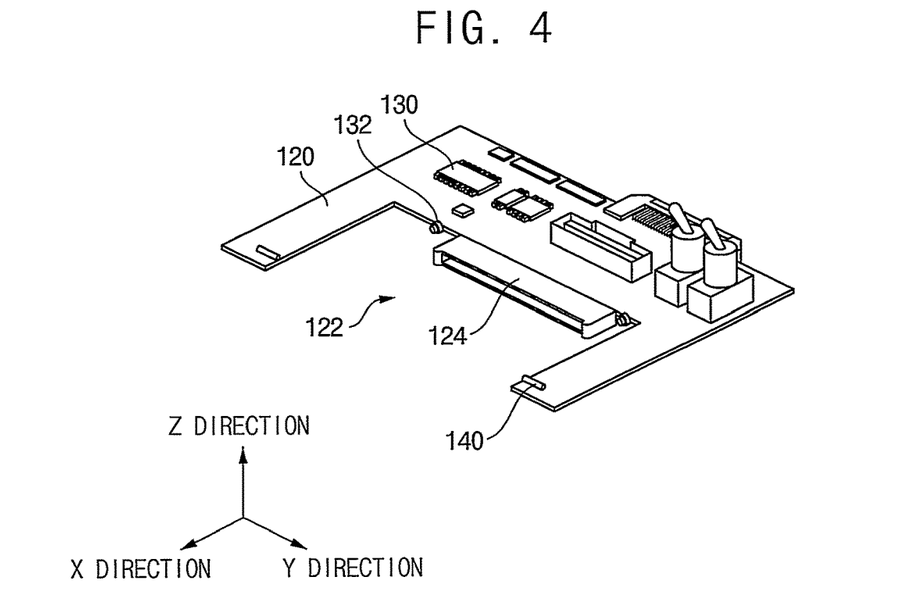
FIG. 4 is a perspective view of a test board of FIG. 3.

FIG. 1 is a perspective view of storage device testing system according to at least one embodiment of the inventive concept. FIGS. 2 and 3 are perspective views of a storage device testing module according to at least one embodiment of the inventive concept. FIG. 4 is a perspective view of a test board of FIG. 3.

Referring to FIGS. 1 to 4, a storage device testing system 10 may include a plurality of storage device testing modules configured to test a plurality of storage devices. The storage device testing system 10 may further include a control device 12.

The plurality of storage device testing modules may be disposed in a plurality of rows and/or columns in the storage device testing system 10. The storage device testing system 10 may be a system for testing reliability of the plurality of storage devices. The plurality of storage devices may include a storage device 20. In at least one embodiment, the storage device 20 includes a solid-state drive (SSD). In at least one embodiment, the SSD is a storage medium including a NAND flash memory and a controller controlling the NAND flash memory, and the storage device 20 is therefore a storage device having high read/write speeds and low power consumption characteristics.

The control device 12 may be variously provided inside of or externally to the storage device testing system 10. The control device 12 may control various devices. In at least one embodiment, the control device 12 controls a robot arm to mount the storage device 20 on the storage device testing module 100. The control device 12 may control overall operations of the storage device testing system 10. In at least one embodiment, the control device 12 controls an automatic testing process of the storage device testing system 10 such that the storage device testing system 10 automatically tests the storage device 20.

The control device 12 may operate in an automatic control mode or in a manual control mode at the discretion and convenience of an operator of the storage device testing system 10. The control device 12 may receive data from sensors such as a temperature sensor, a barometric pressure sensor, etc., that may be installed externally to the storage device testing system 10, and the data received from the sensors may be used for testing the storage device 20. In at least one embodiment, the control device 12 includes a communication line configured to exchange data among storage device testing modules of the plurality of storage device testing modules included in the storage device testing system 10.

In at least one embodiment, a storage device testing module 100 of the plurality of storage device testing modules includes a plate 110, a test board 120, a sensor 130, plungers 140, a housing 150, and a camera 160.

In at least one embodiment, the test board 120 is provided on the plate 110. The storage device testing module 100 may test the storage device 20 using the test board 120 provided on the plate 110. The plate 110 may be provided on a shelf of the storage device testing system. In at least one embodiment, the plate 110 is fixedly provided on a shelf of the storage device testing system 10. A first horizontal direction (X direction) refers to a direction in which the test board 120 may be externally exposed from the storage device testing system 10, a second horizontal direction (Y direction) refers to a horizontal direction orthogonal to the first horizontal direction, and a vertical direction (Z direction) refers to a direction orthogonal to the first horizontal direction and the second horizontal direction.

The plate 110 may support the test board 120 via a plurality of support bars 112. In at least one embodiment, a cooling fan 30 is disposed on the plate 110, and the cooling fan 30 ventilates heat generated during an operation of the storage device testing module 100 away from the test board 120. The test board 120 and the cooling fan 30 of the storage device testing module 100 may receive power from the control device 12 to perform a test on the storage device 20.

In at least one embodiment, the test board 120 includes a storage device receiver 122 configured to receive the storage device 20. For example, the storage device 20 may be inserted in and accommodated in the storage device receiver 122. When the storage device receiver 122 receives the storage device 20, the storage device testing module 100 may proceed with the test.

The test board 120 may include a socket 124 connecting to a connector of the storage device 20 to test the storage device 20, and a support 126 supporting a lower surface of the storage device 20. In at least one embodiment, the socket 124 is included in the storage device receiver 122.

In at least one embodiment, the test board 120 may be fixedly provided on the plate 110. The test board 120 may be fixedly supported on the plate 110 by the plurality of the support bars 112. In at least one embodiment, the plate 110 may be moved using a sliding mechanism such as rails, wheels, etc., such that the test board 120 is at least partially exposed outside of the storage device testing system 10 so that the storage device 20 may be received by the test board 120 or removed from the test board 120. In at least one embodiment, the plate 110 is fixedly provided, and the test board 120 is at least partially externally exposed from the storage device testing system 10 without moving the plate 110. In at least one embodiment, the test board 120 is provided on a sliding mechanism attached to the plate 110, and the test board 120 moves via the sliding mechanism.

The storage device receiver 122 may include an empty space in which the storage device 20 is received. For example, the storage device 20 may be inserted in the empty space, and the empty space may accommodate the storage device 20 by at least partially surrounding the storage device 20. In some embodiments, the storage device receiver 122 may be variously shaped and/or designed according to a type of storage device to be tested. The storage device receiver 122 may include an inner surface that contacts the storage device 20 when the storage device 20 is inserted. In at least one embodiment, the storage device receiver 122 receives the storage device 20 in the first horizontal direction (X direction). For example, the storage device 20 may be inserted into the storage device receiver 122 in a direction along the first horizontal direction (X direction). A direction in which the storage device 20 moves to be received and inserted may be referred to as the insertion direction.

The storage device 20 may be detachably received in the storage device receiver 122 as it moves in the insertion direction toward the storage device receiver 122 of the test board 120. The storage device 20 may be inserted into the storage device receiver 122 and may be coupled with the storage device receiver 122. In at least one embodiment, a width of the storage device 20 may be smaller than a width of the storage device receiver 122. Accordingly, when the storage device 20 is inserted into the storage device receiver 122, the support 126 may vertically support the storage device 20 and the storage device receiver 122 may be coupled to surfaces of the storage device 20. In an example, the storage device receiver 122 may at least partially surround a front surface of the storage device 20 and two side surfaces of the storage device.

In some embodiments, the design and shape of the socket 124 may vary according to the type of the storage device 20. The socket 124 may be electrically connected to the connector of the storage device 20 so that the test may proceed. The socket 124 may protrude in the first horizontal direction (X direction). For example, the socket 124 may protrude from the inner surface of the storage device receiver 122 in a direction opposite to the insertion direction. The socket 124 may extend in the second horizontal direction (Y direction) along the inner surface of the storage device receiver 122, and may include two opposite ends. The socket 124 may contact the connector of the storage device 20 when the storage device receiver 122 receives the storage device 20. For example, the socket 124 may be connected to the connector of the storage device 20 when the storage device 20 is inserted into the storage device receiver 122 and contacts the inner surface.

The support 126 may support the lower surface of the storage device 20 after the storage device 20 is received in the storage device receiver 122 of the test board 120. In at least one embodiment, the support 126 is supported by the plurality of support bars 112 of the plate 110. In at least one embodiment, the support 126 is directly connected to the test board 120.

FIGS. 5 to 9 are views of a sensor and a plurality of plungers according to at least one embodiment of the inventive concept.

Figure 5:
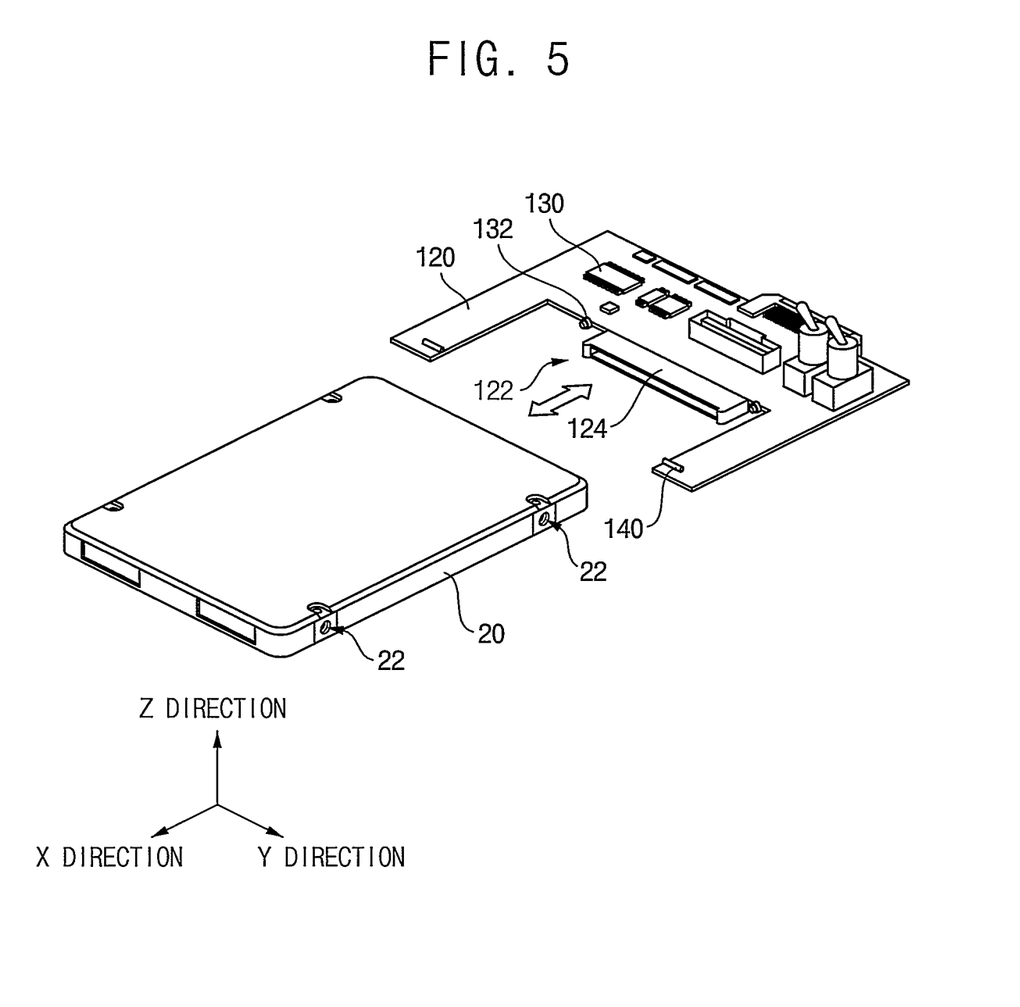
FIGS. 5 to 9 are views of a sensor and a plurality of plungers according to at least one embodiment of the inventive concept.
Figure 6:
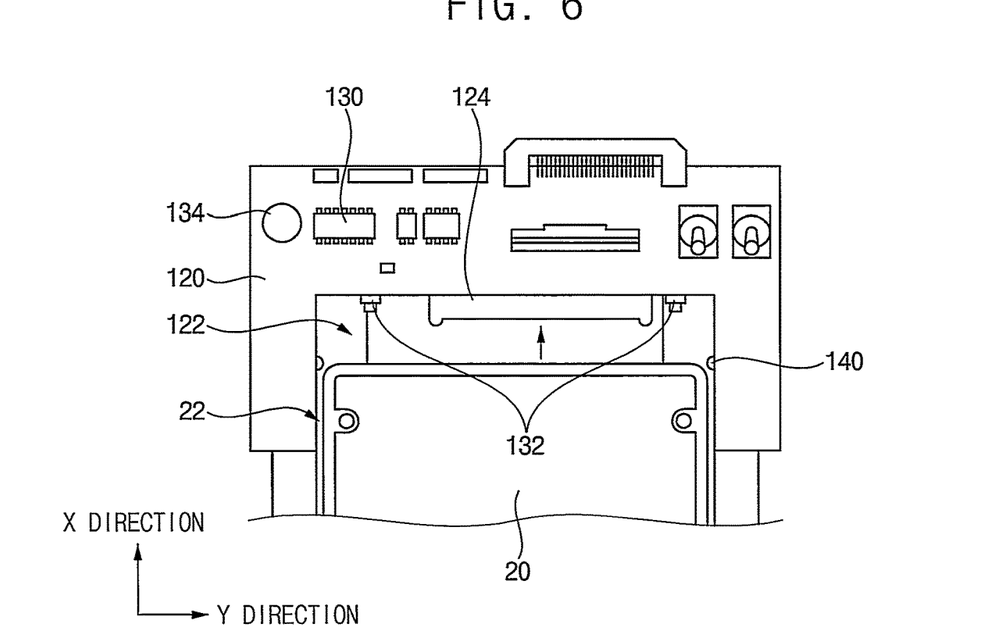
Figure 7:
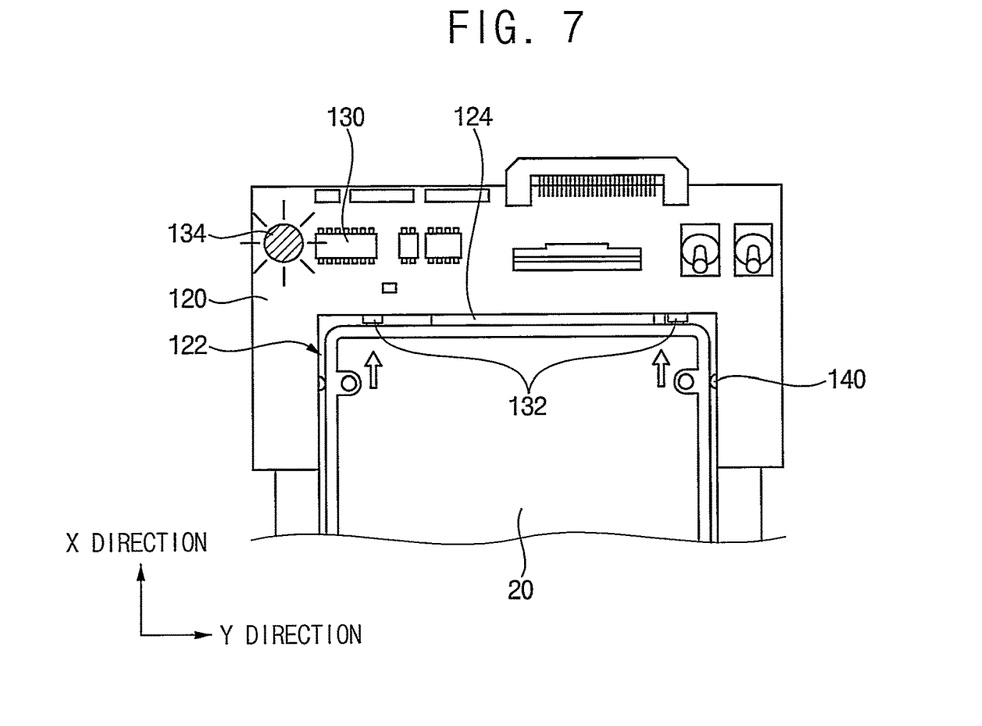

Referring to FIGS. 5 to 7, the sensor 130 may include switches 132. The switches 132 may be provided on the storage device receiver 122 of the test board 120. In at least one embodiment, the plurality of switches 132 are provided on the inner surface of the storage device receiver 122. The switches 132 may protrude in the first horizontal direction (X direction) from the inner surface of the storage device receiver 122. The switches 132 may protrude in the direction opposite to the insertion direction. In at least one embodiment, a switch 132 may be provided adjacent to each end of the socket 124.

In at least one embodiment, the sensor 130 recognizes (e.g., determines) whether the storage device 20 is completely mounted on the test board 120. For example, the sensor 130 may determine whether the storage device 20 has been fully inserted into the storage device receiver 122 of the test board 120 using the switches 132. When the storage device 20 is inserted into the storage device receiver 122, the switches 132 may be depressed by the storage device 20 in the insertion direction in which the storage device 20 is inserted. When all of the switches 132 are fully depressed by the storage device 20 (e.g., are activated), the sensor 130 receives a signal indicating that all of the switches 132 are activated, and the sensor 130 may thereby recognize that the storage device 20 is fully received by the storage device receiver 122 and completely mounted on the test board 120. If the storage device 20 is not fully received by the storage device receiver 122 because, for example, the storage device 20 is not inserted in the insertion direction or is not inserted sufficiently far in the insertion direction, at least one of the switches 132 may not be fully depressed (e.g., activated) and the sensor 130 might not receive a signal indicating that the storage device 20 is fully received. Instead, the sensor may receive a signal indicating that the storage device 20 is partially inserted when one or more switches 132 is activated while one or more of the remaining switches 132 is not activated, or the sensor 130 may receive a signal that the storage device is not inserted when none of the switches 132 are activated.

In at least one embodiment, the sensor 130 may further include a light emitter 134 configured to generate a signal based on the switches 132. For example, the light emitter 134 may generate a "ready" signal when no switches 132 are activated, may generate an "in progress" signal when one or more switches 132 are partially depressed, may generate a "complete" signal when all of the switches 132 are activated (i.e., fully depressed), and may generate an "error" signal when at least one switch 132 is activated and at least one switch 132 is not activated. In at least one embodiment, the light emitter 134 includes a display device such as an LED, and each of the ready, in progress, complete, and error signals are displayed as a different color light emitted from the LED. Accordingly, an operator of the storage device testing system 10 and/or the storage device testing module 100 may easily perceive the insertion status of the storage device 20. In at least one embodiment, the light emitter 134 generates signals based on whether the test of the storage device 20 is in progress or whether an error has occurred. Therefore, the sensor 130 may recognize the storage device 20 (e.g., determine that the storage device receiver 122 has fully received the storage device 20) when the storage device 20 is inserted into the storage device receiver 122 by a preset distance in the insertion direction.

Figure 8:
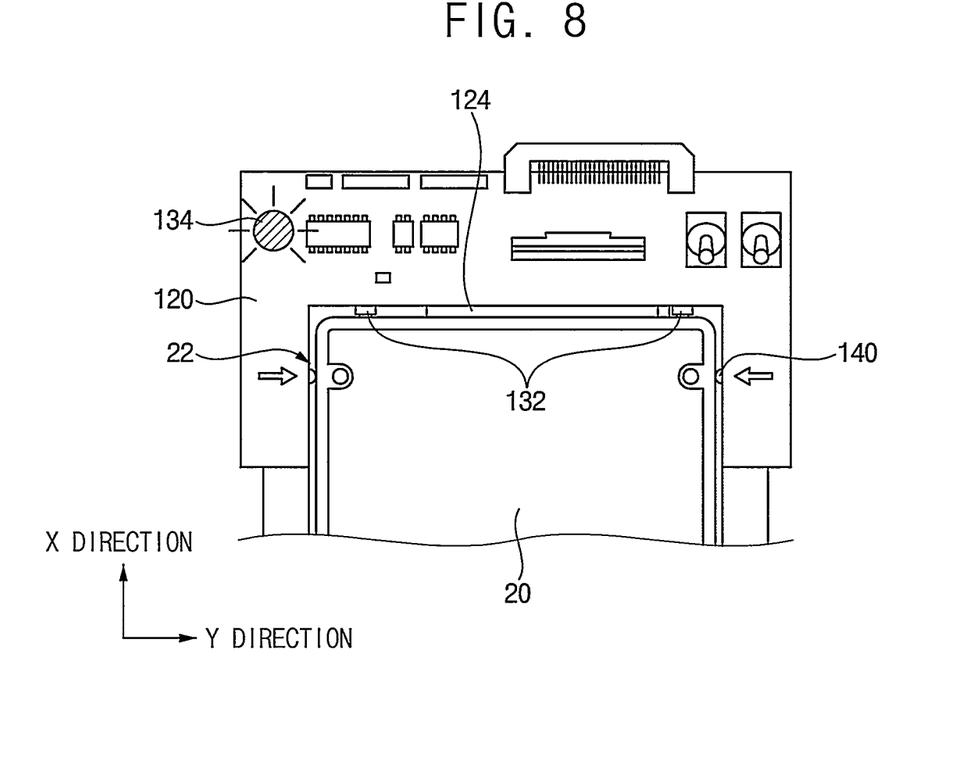
Figure 9:
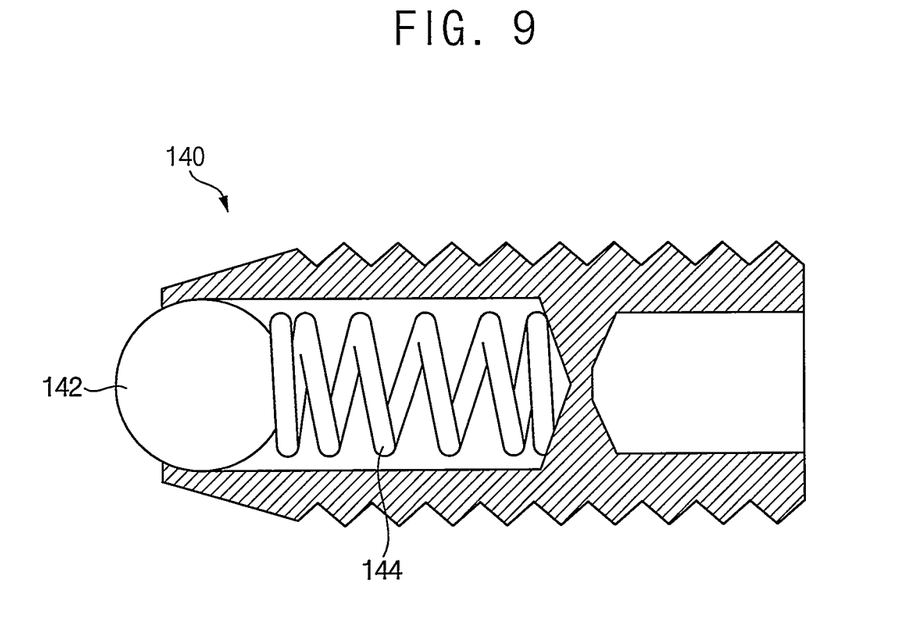

Referring to FIGS. 5, 6 and 8, the plungers 140 may be provided in the storage device receiver 122 and may secure the storage device 20 after it is received by the storage device receiver 122. One or more of the plungers 140 may include a spring ball plunger configured to press against one a side of the storage device 20 using a spring so that the storage device 20 is secured in the storage device receiver 122. For example, a change in the position of the storage device 20 may occur while the storage device 20 is being tested due to external environmental factors such as airflow and temperature change. Accordingly, the plungers 140 may prevent the storage device 20 from being separated or removed from the socket 124 while the storage device 20 is being tested due to the external environmental factors.

The plungers 140 may be provided on the inner surface of the storage device receiver 122. The plungers 140 may protrude from the inner surface in the second horizontal direction (Y direction). The plungers 140 may protrude from the inner surface in a direction perpendicular to the insertion direction. In at least one embodiment, the plungers 140 may press against two sides of the storage device 20 in the direction perpendicular to the insertion direction.

In at least one embodiment, the storage device 20 includes grooves 22 disposed on sides of the storage device 20 such that each groove 22 contacts and receives a corresponding plunger 140 when the storage device 20 is inserted into the storage device receiver 122 by a preset distance. When the storage device 20 is inserted into the storage device receiver 122 by the preset distance in the insertion direction, the plungers 140 may press into the corresponding grooves 22, thereby securing the storage device 20 in the storage device receiver 122 by restricting movement of the storage device 20 to the insertion direction.

Therefore, according to at least one embodiment of the inventive concept, the plungers 140 may secure the storage device 20 when the storage device 20 is inserted into the storage device receiver 122 by the preset distance in the insertion direction, and the sensor 130 may recognize the insertion of the storage device 20 based on all the switches 132 being activated when the storage device 20 is inserted by the preset distance. Accordingly, when the storage device receiver 122 receives the storage device 20 by the preset distance, the plungers 140 may secure the storage device 20, and the sensor 130 may recognize the insertion of the storage device 20 at the same time.

At least one of the plungers 140 may include a ball 142 contacting the storage device 20 and a spring 144 pressing the ball 142 against a side surface of the storage device 20 in a lateral direction. The groove 22 engaged with the ball 142 may be formed in the side surface. As the storage device 20 is inserted into the storage device receiver 122, the spring 144 may compress in a direction opposite to the lateral direction. The spring 144 may expand when the groove 22 reaches the ball 142 and the ball 142 is inserted into the groove 22 so that the ball 142 and the groove 22 are engaged with each other. This engagement may restrict movement of the storage device 20. However, the groove 22 may be a concave shape curving inwardly in the lateral direction, so that the spring 144 may compress when the storage device 20 is strongly pulled in the direction opposite to the insertion direction, allowing the storage device 20 to be separated from the storage device receiver 122. Therefore, the plungers 140 may fix the storage device 20 in place so that the storage device 20 is securely held in the storage device receiver 122 while the storage device 20 is being tested, but may allow the storage device 20 to be removed from the storage device receiver 122.

Figure 10:
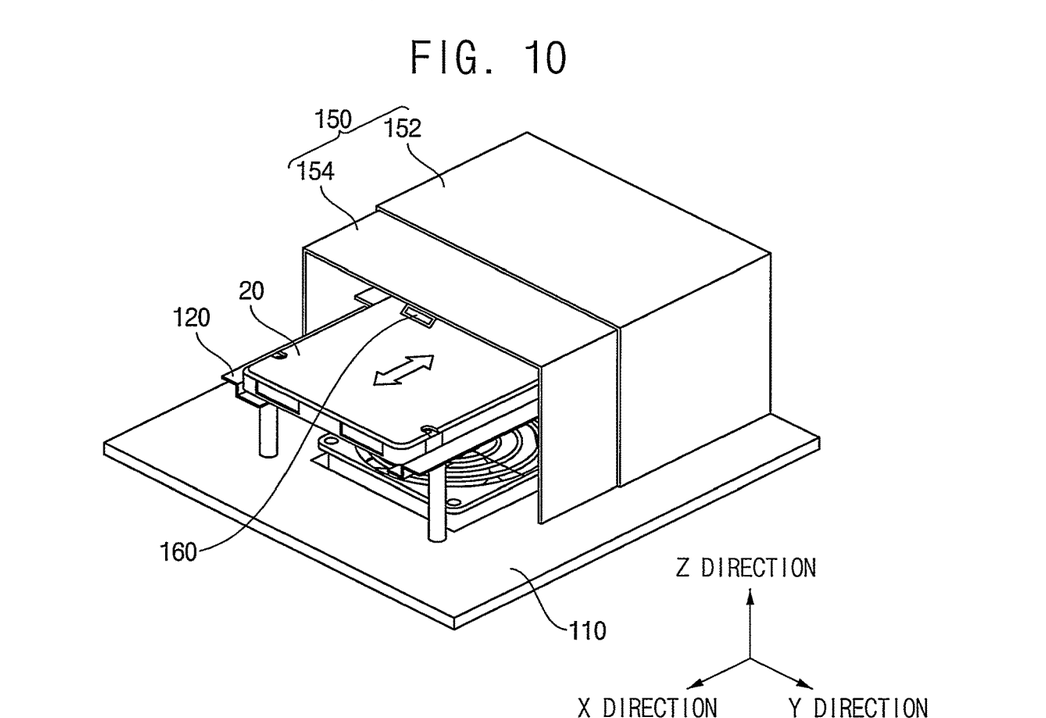
FIGS. 10 and 11 are perspective views of a housing and a camera according to at least one embodiment of the inventive concept.
Figure 11:
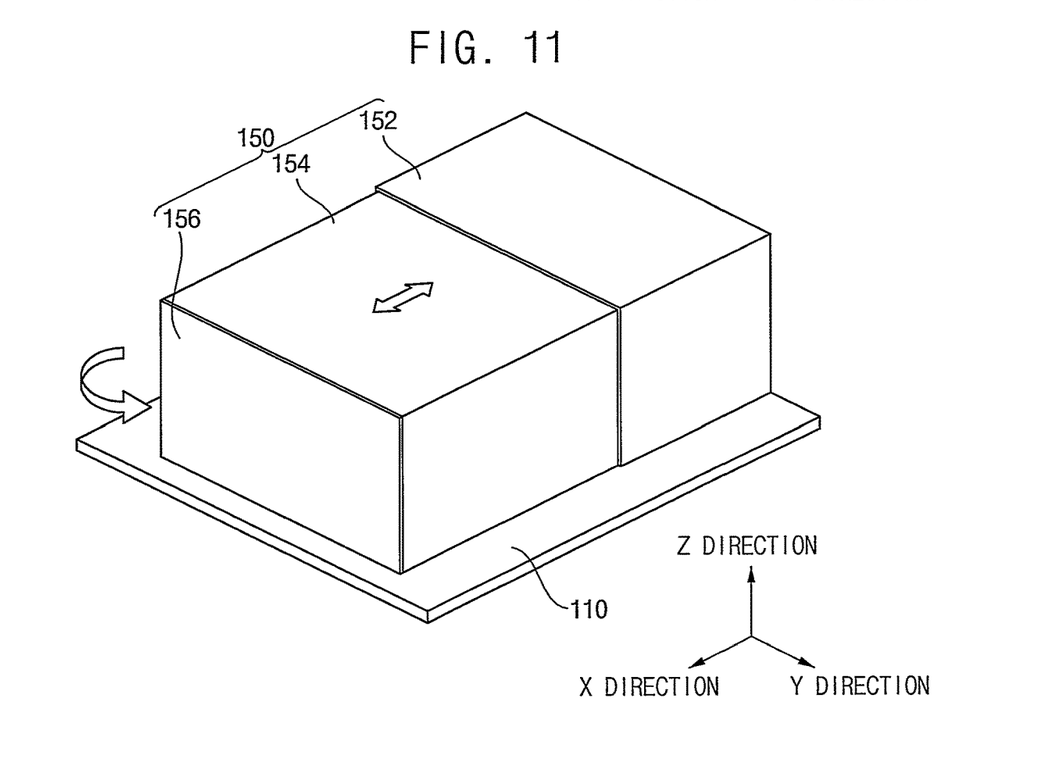

FIGS. 10 and 11 are perspective views of a housing and a camera according to at least one embodiment of the inventive concept.

Referring to FIGS. 10 and 11, the housing 150 may be configured to protect the test board 120 from an external environment by at least partially surrounding the test board 120. For example, during the test of the storage device 20, a change in the position of the storage device 20 may occur due to external environmental factors such as airflow, temperature change, and/or an impact received by the test board 120. By surrounding the test board 120, the housing 150 may prevent the storage device 20 from being separated or removed from the socket 124 due to the environmental factors while the storage device 20 is being tested.

The housing 150 may compensate for a weakness of a connection between the connector of the storage device 20 and the socket 124. For example, the housing 150 may prevent phenomena such as electrostatic discharge (ESD) and electromagnetic interference (EMI). In at least one embodiment, the storage device 20 does not have a case. The housing 150 may minimize the impact of external environmental factors on a storage device 20 that does not have a case.

In at least one embodiment, the housing 150 may include a fixed segment 152 fixed to the plate 110 and may include a movable segment 154 slidably movable along a plurality of guide rails provided on the fixed segment 152 and/or the plate 110. The housing 150 may further include a door 156 configured block the housing 150 from the outside when the storage device 20 is mounted on the test board 120. In at least one embodiment, the door 156 is included in the movable segment 154. In at least one embodiment, the door 156 is disposed in a side of the movable segment 154. For example, the door 156 may close when the storage device 20 is mounted on the test board 120, thereby separating the test board from an external environment.

The housing 150 may protect the test board 120 by blocking the test board 120 from the outside (e.g., separating the test board 120 from the external environment) using the fixed segment 152, the movable segment 154, and the door 156 while the storage device 20 is inserted into the test board 120 and the test is in progress. The housing 150 may expose the test board 120 to the outside (e.g., the external environment) using the movable segment 154 and the door 156 in order to mount the storage device 20 on the test board 120 or remove the storage device 20 from the test board 120. Therefore, the housing 150 may use the movable segment 154 and the door 156 to expose the test board 120 to the external environment and to separate the test board 120 from the external environment.

The fixed segment 152 may be fixedly provided on the plate 110. In at least one embodiment, a plurality of test boards 120 are provided on the plate 110, and fixed segments 152 may be respectively provided on each test board of the plurality of test boards 120. The fixed segment 152 may include a structure such that the plate 110 and/or the test board 120 may move slidably to be at least partially exposed from the fixed segment 152 to the outside of the storage device testing system 10 such that the storage device 20 may be mounted on the test board 120.

The movable segment 154 may move along the guide rails provided in the plate 110 or in the fixed segment 152. The guide rails may be provided along the first horizontal direction (X direction). The movable segment 154 may move slidably along the first horizontal direction (X direction) to expose the test board 120 from the storage device testing system 10 in order to mount the storage device 20. The movable segment 154 may include a structure such that the plate 110 or the test board 120 may move slidably the first horizontal direction (X direction) to be at least partially exposed to the outside of the storage device testing system 10 such that the storage device 20 may be mounted on the test board 120.

The movable segment 154 may move slidably to extend from or insert into the fixed segment 152 so that the housing 150 is in an open state or a blocked state, respectively. When the movable segment 154 is extended from the fixed segment 152, the door 156 may open the housing 150 to the outside or may block the housing 150 from the outside. For example, the door 156 may open or close in response to an operator's manual operation or in response to a signal received from the control device 12. The door 156 may open be folding or moved toward an upper surface or a side of the movable segment 154. The door 156 may close by rotating or sliding from the upper surface or the side of the movable segment 154. In at least one embodiment, the door 156 may move to be separated from both sides of the movable segment 154. In at least one embodiment, the control device 12 may open or close the door 156 in response to receiving information from one of the sensors. For example, the control device 12 may open or close the door 156 in response to temperature readings received from a temperature sensor meeting a predetermined threshold temperature. In at least one embodiment, the temperature sensor is operatively connected to the housing (e.g., the temperature sensor contacts the housing), and the temperature sensor is configured to instruct the control device 12 to open the door in response to a temperature inside the housing 150.

In at least one embodiment, the camera 160 may be provided inside the housing 150. The camera 160 may include any device capable of photography, such as an image camera, an image sensor, etc. The camera 160 may analyze the storage device 20 mounted on the test board 120 and may monitor the storage device 20 prior to, during, and after the storage device testing module 100 tests the storage device 20. For example, the camera 160 may control a testing process by monitoring the storage device 20 and informing the control device 12 of the storage device testing system 10 and/or an operator of the storage device testing system 10 and/or the storage device testing module 100 of conditions of the storage device 20.

The camera 160 may be provided on each test board 120. The camera 160 may be spaced apart from the test board 120 and may face toward the test board 120. In at least one embodiment, the camera 160 is disposed inside the movable segment 154. The camera 160 may be provided in or on an inner surface of the movable segment 154 and may face the test board 120. Accordingly, the camera 160 may photograph the storage device 20 mounted on the test board 120 and may photograph the front surface of the storage device 20 while moving along the moving direction of the movable segment 154.

The camera 160 may scan product information (serial number, pin number, barcode, etc.) on a sticker attached to one side of the storage device 20 to receive a specification of the storage device 20. The camera 160 may provide the specification to the control device 12. Accordingly, the storage device testing module 100 may perform a test according to the specification of the storage device 20. The camera 160 may scan by specifying the location of the product information or label on the sticker attached to the storage device 20. Accordingly, the camera 160 may selectively scan a specific location while scanning each storage device 20, thereby increasing the scanning speed of the camera.

In at least one embodiment, the camera 160 includes an illuminator. The illuminator may illuminate the storage device 20 to be tested, thereby increasing the recognition rate of the camera 160. The illuminator may be implemented as an LED lamp or the like.

In at least one embodiment, the camera 160 records images or photos of the storage device 20 mounted on the test board 120 and determines if an error has occurred that is detectable by visual inspection (such as whether the storage device 20 is received securely into the storage device receiver 122, whether the storage device is properly mounted, or the like) by analyzing the images or photos. For example, in at least one embodiment, the camera 160 includes a processor that is pre-trained to perform various artificial intelligence-based image recognition and analysis processes, and thereby confirms that the storage device 20 is not mounted securely on the test board 120 by analyzing images or photos of the storage device 20 recorded during the testing process. If the camera detects an error, the camera may send an alert signal to the control device 12 and/or the operator of the storage device testing system 10 and/or the storage device testing module 100.

In at least one embodiment, the camera 160 provides the recorded images or photos to the operator via the control device 12. The operator may determine whether or not the storage device 20 is mounted securely on the test board 120, whether or not the storage device 20 is inserted into a desired test board 120, and the like, by examining the recorded images or the photos.

Figure 12:
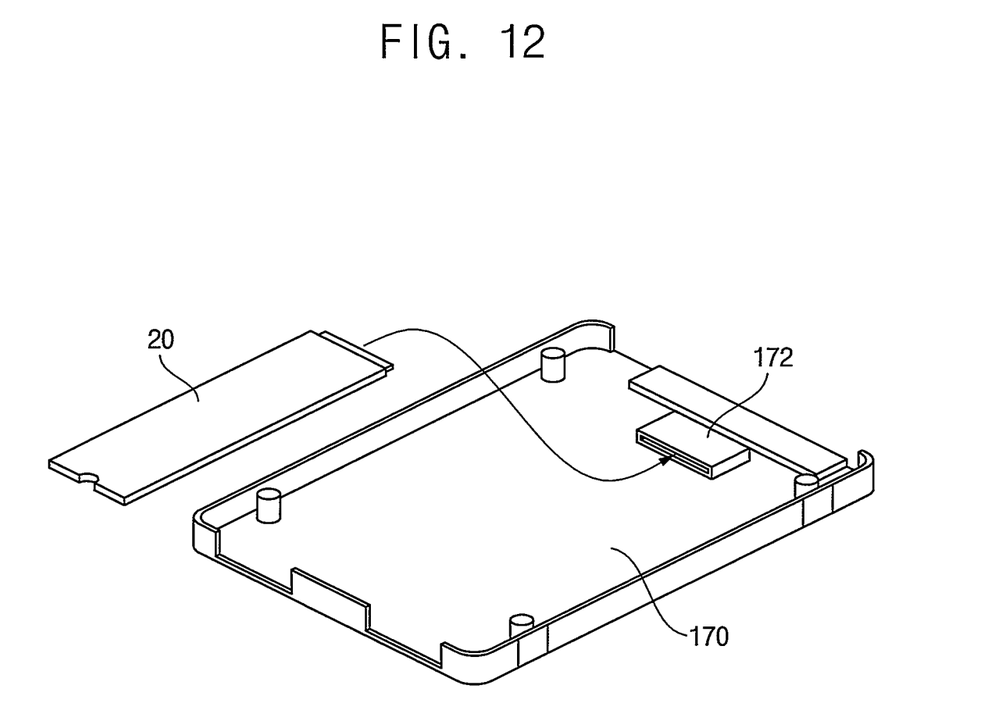
FIGS. 12 to 14 are views of a container accommodating a storage device according to at least one embodiment of the inventive concept.
Figure 13:
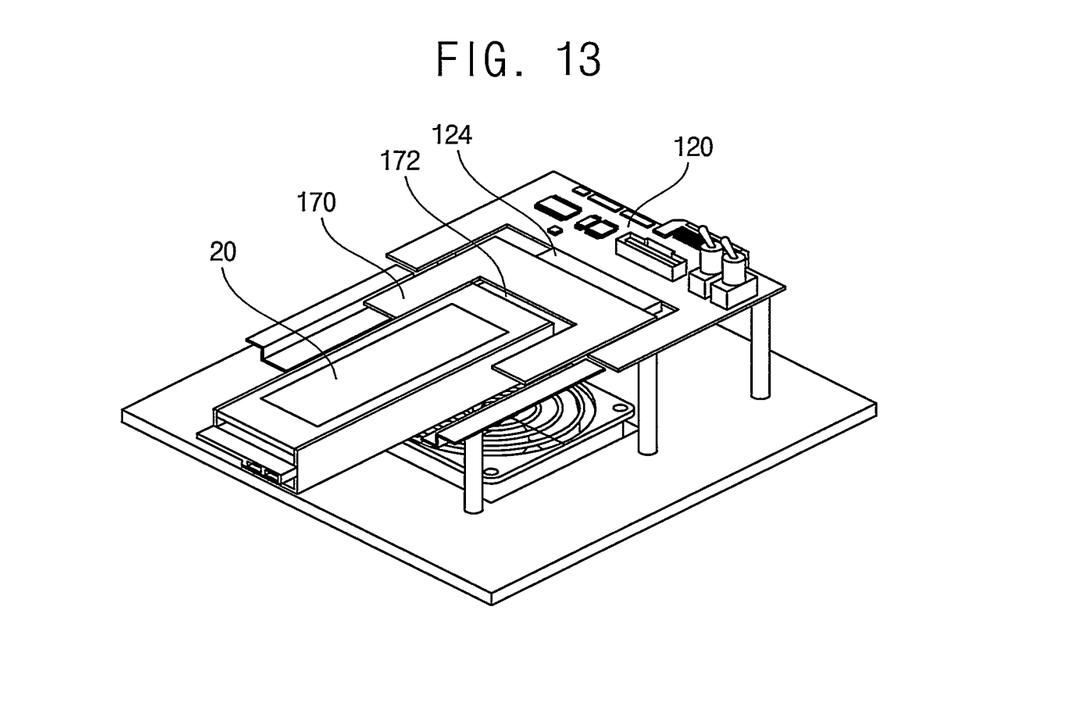
Figure 14:
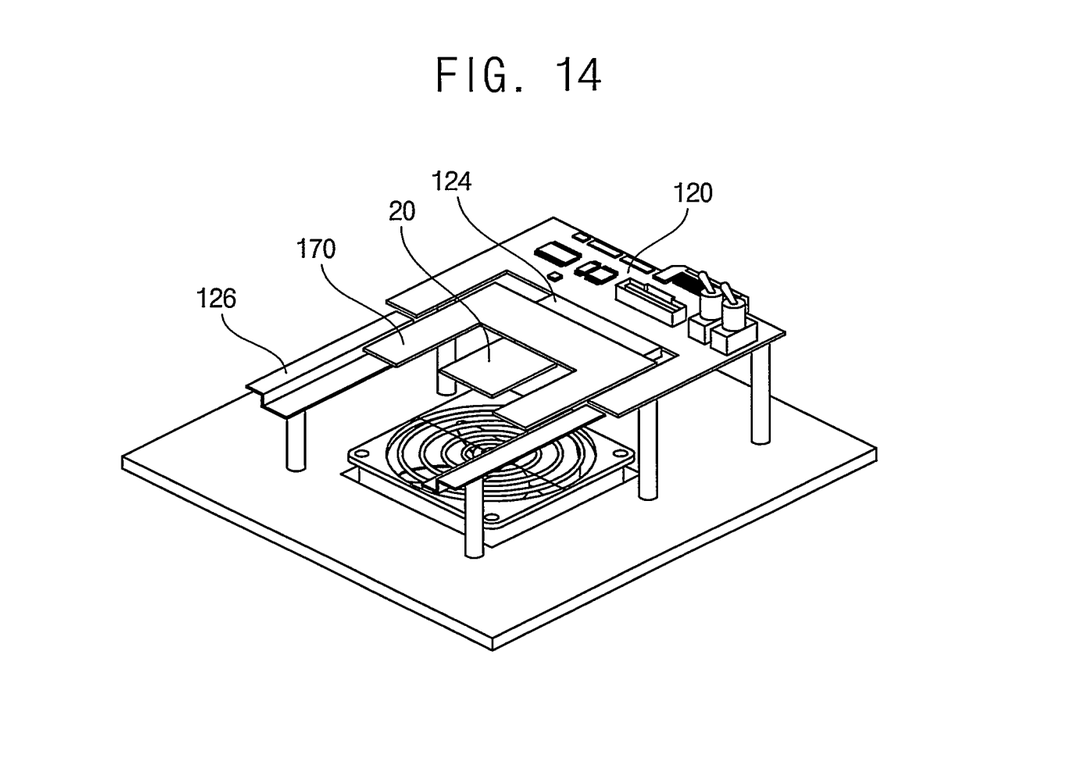

FIGS. 12 to 14 are views of a container accommodating a storage device according to at least one embodiment of the inventive concept.

Referring to FIGS. 12 and 14, the storage device testing module 100 may include a container 170. The container 170 may accommodate the storage device 20 so that the test board 120 may test the storage device 20 accommodated in the container 170. In at least one embodiment, the storage device 20 includes an SSD. The SSD may be variously implemented, including as a 2.5″ (U.2, U.3), EDSFF, and M.2. In at least one embodiment, as the SSD may be implemented according to various sizes and standards, the SSD might not fit into the storage device receiver 122 of the test board 120. Therefore, the container 170 may adapt the SSD to fit into the storage device receiver 122 by accommodating the storage device 20 and being inserted into the storage device receiver 122. In at least one embodiment, the size and shape of the container 170 may vary according to the type of the SSD to be accommodated in the container 170.

The container 170 may be movable in the front-rear direction (e.g., the first horizontal direction) to be detachably mounted in the storage device receiver 122 of the test board 120. The container 170 may include a storage device slot configured to accommodate the storage device 20. The storage device 20 may be inserted into the storage device slot to be coupled with the container 170, and the container 170 may be coupled with the storage device receiver 122. For example, a width of the container 170 may be smaller than the width of the storage device receiver 122. Accordingly, when the container 170 is inserted into the storage device receiver 122, the support 126 may support a lower surface of the container 170, and the storage device receiver 122 may at least partially surround the left, right, and front surfaces of the container 170.

In at least one embodiment, a bottom surface of the container 170 may include a bottom hole. The bottom hole may reduce air resistance when the storage device 20 is coupled with the container 170 and prevent static electricity from being applied to the storage device 20.

A container socket 172 for electrical connection with the storage device 20 may be provided at the front of the container 170. For example, the storage device 20 may be inserted into the container socket 172, and the container socket 172 may be inserted into the socket 124 of the test board 120, thereby electrically connecting the storage device 20 to the test board 120 to perform the test.

As described above, the storage device testing module 100 may use the sensor 130 to confirm whether the storage device 20 is mounted on the test board 120, and the storage device testing module 100 may prevent the storage device 20 from being pushed back in the insertion process of the storage device 20 by using the plungers 140 to restrict the movement of the storage device 20. Furthermore, the storage device testing module 100 may use the housing 150 to remove external interference factors, the storage device testing module 100 may control the evaluation test case (e.g., the test) for each product (e.g., the storage device 20) according to label information or a pin number disposed on the storage device 20 and scanned by the camera 160, and the storage device testing module 100 may check whether or not the storage device 20 is mounted securely.

While the inventive concept has been particularly shown and described with reference to embodiments thereof, it will be understood that various changes in form and details may be made therein without departing from the spirit and scope of the present disclosure.

What is claimed is:

1. A storage device testing module comprising:
a plate;
a test board disposed on the plate and including a storage device receiver, the storage device receiver receiving a storage device to be tested;
a sensor including a plurality of switches disposed on an inner surface of the storage device receiver, the plurality of switches being activated by movement of the storage device into the storage device receiver; and a plurality of plungers disposed on the inner surface, contacting and supporting the storage device.

2. The storage device testing module of claim 1, wherein the test board further includes a socket disposed on the inner surface and connected to a connector of the storage device, and wherein the plurality of switches includes a first switch and a second switch respectively disposed adjacent to opposite ends of the socket.

3. The storage device testing module of claim 2, wherein the sensor further includes a light emitter configured to generate a light emitting signal when at least one of the first switch and the second switch are activated.

4. The storage device testing module of claim 1, wherein at least one plunger of the plurality of plungers includes a ball contacting one side of the storage device and a spring elastically supporting the ball.

5. The storage device testing module of claim 1, wherein the storage device includes a solid-state drive (SSD).

6. The storage device testing module of claim 5, further comprising:
a container accommodating the SSD, the container configured to be inserted into the storage device receiver.

7. The storage device testing module of claim 1, further comprising:
a housing disposed on the plate and at least partially surrounding the test board, the housing protecting the test board from an external environment.

8. The storage device testing module of claim 7, wherein the housing includes:
a fixed segment fixedly disposed on the plate and at least partially covering the test board, the fixed segment including an opening, wherein the storage device is inserted into the opening;
a movable segment movable slidably toward and away from the opening along a plurality of guide rails disposed on the plate; and
a door disposed in the movable segment and configured to expose the test board to the external environment and separate the test board from the external environment.

9. The storage device testing module of claim 1, further comprising:
a camera configured to photograph the storage device on the test board for confirming that the storage device is secure in the storage device receiver.

10. The storage device testing module of claim 9, wherein the camera selectively scans the storage device by specifying a position of a label displayed on the storage device.

11. A storage device testing module, comprising:
a plate;
a test board disposed on the plate and including a storage device receiver, the storage device receiver receiving a storage device to be tested;
a housing disposed on the plate and at least partially surrounding the test board, the housing protecting the test board from an external environment; and
a camera disposed in the housing and facing the test board, the camera configured to photograph the storage device.

12. The storage device testing module of claim 11, wherein the housing includes:
a fixed segment fixedly disposed on the plate and at least partially covering the test board, the fixed segment including an opening, wherein the storage device is inserted into the opening;
a movable segment movable slidably toward and away from the opening along a plurality of guide rails disposed on the plate; and
a door disposed in the movable segment and configured to expose the test board to the external environment and separate the test board from the external environment.

13. The storage device testing module of claim 12, wherein the camera is disposed on the movable segment such that the camera moves together with the movable segment and photographs a front of the storage device.

14. The storage device testing module of claim 12, wherein the housing contacts a temperature sensor, and wherein the temperature sensor is configured to open the door according to a temperature inside the housing.

15. The storage device testing module of claim 11, wherein the camera selectively scans the storage device by specifying a position of a label displayed on the storage device.

16. The storage device testing module of claim 11, further comprising:
a sensor including a plurality of switches disposed on an inner surface of the storage device receiver, the plurality of switches being activated by movement of the storage device into the storage device receiver.

17. The storage device testing module of claim 16, wherein the test board further includes a socket disposed on the inner surface and connected to a connector of the storage device,
the plurality of switches includes a first switch and a second switch respectively disposed to opposite ends of the socket, and
the sensor further includes a light emitter configured to generate a light emitting signal when at least one of the first and second switches are activated.

18. The storage device testing module of claim 11, further comprising:
a plurality of plungers disposed on an inner surface of the storage device receiver, contacting and supporting the storage device,
wherein at least one plunger of the plurality of plungers includes a ball contacting the storage device and a spring elastically supporting the ball.

19. The storage device testing module of claim 11, wherein the storage device includes a solid-state drive (SSD), and
the storage device testing module further comprises a container accommodating the SSD, the container configured to be inserted into the storage device receiver.

20. A storage device testing module, comprising:
a plate;
a test board disposed on the plate and including a storage device receiver, the storage device receiver receiving a storage device to be tested;
a sensor including a plurality of switches disposed on an inner surface of the storage device receiver, the plurality of switches being activated by movement of the storage device into the storage device receiver;
a plurality of plungers disposed on the inner surface, contacting and supporting the storage device;
a housing disposed on the plate and at least partially surrounding the test board, the housing configured to protect the test board from an external environment; and
a camera disposed in the housing and facing the test board, the camera configured to photograph the storage device for confirming that the storage device is secured in the storage device receiver.

* * * * *